Aug. 12, 1924.
1,504,741

G. C. CHASE

COUNTING WHEEL CARRY MECHANISM

Filed Sept. 11, 1923   5 Sheets-Sheet 1

Fig. 1.

INVENTOR.
Geo. C. Chase.
BY E.W. Anderson
ATTORNEY

Aug. 12, 1924.

G. C. CHASE 1,504,741

COUNTING WHEEL CARRY MECHANISM

Filed Sept. 11, 1923  5 Sheets-Sheet 2

INVENTOR.
Geo. C. Chase.
BY E.D. Anderson
ATTORNEY.

Aug. 12, 1924.

G. C. CHASE 1,504,741

COUNTING WHEEL CARRY MECHANISM

Filed Sept. 11, 1923   5 Sheets-Sheet 3

INVENTOR.
Geo. C. Chase.
BY E. W. Anderson
ATTORNEY.

Aug. 12, 1924.

G. C. CHASE 1,504,741

COUNTING WHEEL CARRY MECHANISM

Filed Sept. 11, 1923    5 Sheets-Sheet 4

INVENTOR
Geo. C. Chase.
BY E.W. Anderson
ATTORNEYS.

Aug. 12, 1924.

G. C. CHASE 1,504,741

COUNTING WHEEL CARRY MECHANISM

Filed Sept. 11, 1923   5 Sheets-Sheet 5

INVENTOR
Geo. C. Chase.
BY E. W. Anderson
ATTORNEY.

Patented Aug. 12, 1924.

1,504,741

UNITED STATES PATENT OFFICE.

GEORGE C. CHASE, OF SOUTH ORANGE, NEW JERSEY, ASSIGNOR TO MONROE CALCULATING MACHINE COMPANY, OF NEW YORK, N. Y., A CORPORATION OF NEW YORK.

COUNTING-WHEEL CARRY MECHANISM.

Application filed September 11, 1923. Serial No. 662,090.

*To all whom it may concern:*

Be it known that I, GEORGE C. CHASE, a citizen of the United States, residing at South Orange, in the county of Essex and State of New Jersey, have made a certain new and useful Invention in Counting-Wheel Carry Mechanism, of which the following is a specification.

Figure 3 is a detail perspective view of the bar which positions the numeral wheels in zeroizing.

This invention has relation to carry mechanism for the counting wheels or other numeral wheels of calculating machines, having for an object to provide means for this purpose in a machine wherein any selected wheel may be used for counting and wherein the carry impulse will be transmitted independently to each wheel to which carry is to occur.

Another object of the invention is to provide a set of counting wheels with registering and carry actions which are harmonic in movement, so that the counting wheels will always start and discontinue their movements gradually, thereby greatly reducing the tendency to overthrow, and further to provide for positive restraining engagement between the counting wheels and their actuators during the harmonically retarded movement, whereby the usual momentum checking devices may be dispensed with. Another object is to provide a reversible carry mechanism which will act on all numeral wheels simultaneously, instead of successively, as heretofore, permitting a much slower movement of the numeral wheel and decreasing the tendency to overthrow. Another object is to provide a construction which will permit the numeral wheels to be free to be restored to zero, or to be shifted laterally with relation to their actuating mechanism, whenever the operating mechanism of the machine is in a full cycle position comprising not only the customary normal position, but a full cycle zone extending for a considerable distance in either direction from normal position, as is explained later.

Another object is to provide a machine with two sets of counting wheels mounted on a common shaft, and to provide for one set being placed in juxtaposition with the carry mechanism. Another object is the provision in a reversible machine of automatically reversible counting wheels provided with carry mechanism. Another object is the provision of means whereby a quotient and the true complement thereof may be simultaneously registered. Other objects and advantages will hereinafter appear.

The invention consists in the novel construction and combinations of parts, as set forth in the appended claims.

The accompanying drawings illustrate an embodiment of the invention as applied to the counting wheels of a calculating machine built in accord with the disclosure of the reissue patent to Baldwin, No. 13,841, as modified by the disclosure of Patent No. 1,275,119, to the same inventor, and by the disclosure of the application for patent of E. F. Britten, Jr., Serial No. 426,043, for calculating machines, filed November 23, 1920.

In these drawings, the numeral 2 designates an endwise shiftable carriage, wherein are mounted numeral wheels 13 and right and left-hand series of counting wheels 50 and 51, both series of the latter upon a common shaft 84. Means are described in said application whereby each rotation of the crank handle 3, in a forward or in a reverse direction, will register upon the numeral wheels 13, positively or negatively, such amounts as may be set up on the keyboard 18.

The two series of counting wheels 50 and 51 are designed to register positively or negatively, the number of rotations of the crank handle made with the carriage in a given position, the numerals of one series of counting wheels being arranged peripherally about the wheels in a direction opposite to the numeral arrangement of the other series of counting wheels so that, the drive being in the same direction for both series, the wheels 50 will register positively while the wheels 51 will register negatively, or vice versa. Thus, in performing addition, the wheels 50 serve as item counters, in multiplication, the wheels 50 register the multiplier, and in division, which is performed by a reverse rotation of the crank handle, the wheels 51 register the quotient.

In item counting and in certain "short cut" methods of performing multiplication, it is desirable that the wheels 50 shall be provided with means for carrying the tens from a lower order to a higher order wheel in either direction of rotation, or as the lower order wheel passes from 9 to 0 or 0 to 9 registering position.

The said two series of counting wheels, in combination with such carry mechanism, enable the machine to accomplish certain results not heretofore attained, owing to the possibility of registering a quotient and the complement thereof at a single operation. Thus it is often desirable to find the percentage of two values to a total, as for instance the percentage of cost to the selling price of merchandise and the percentage of profit, or the percentage of passenger and of freight expense to the total, in railroading. In the former case, if the article cost $3.75 and sells for $4.37, the first amount is divided by the second, the wheels 51 registering 85.81, the percentage of cost to the selling price, and the wheels 50 registering 14.19, the percentage of profit. In the second instance, dividing either the passenger expense or the freight expense by the total will cause both percentages to be registered.

Figure 1:
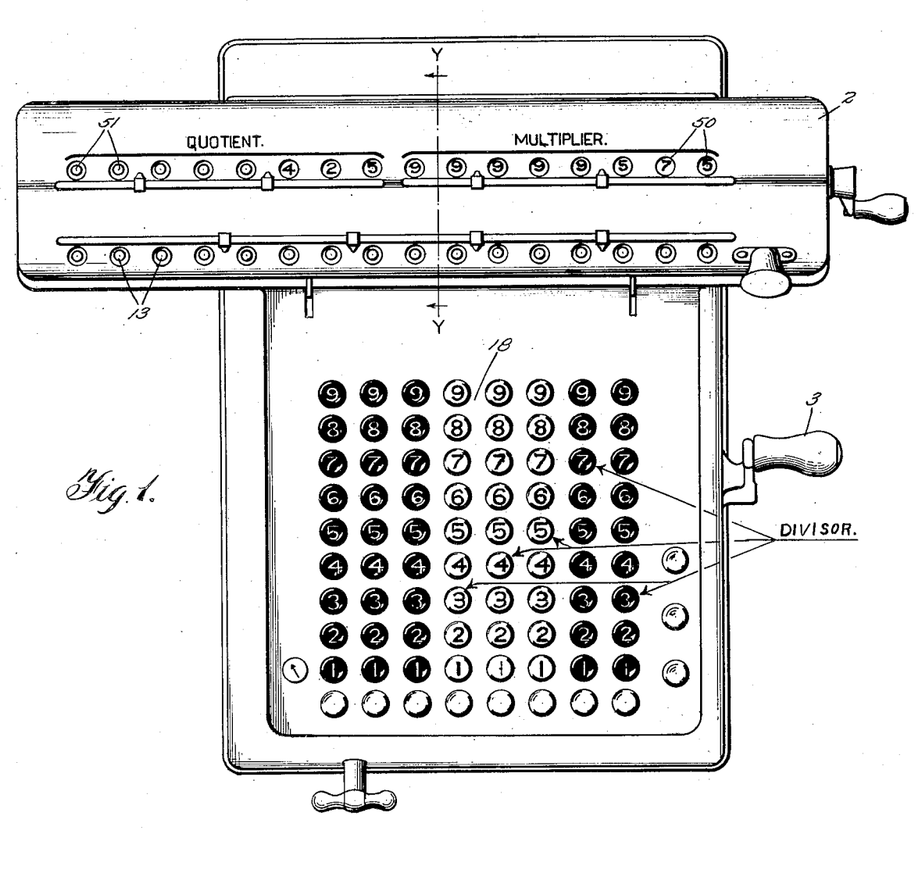
Figure 1 is a plan view of a calculating machine, showing the multiplier and quotient wheels to which the invention is applied.
Figures 1, 2:
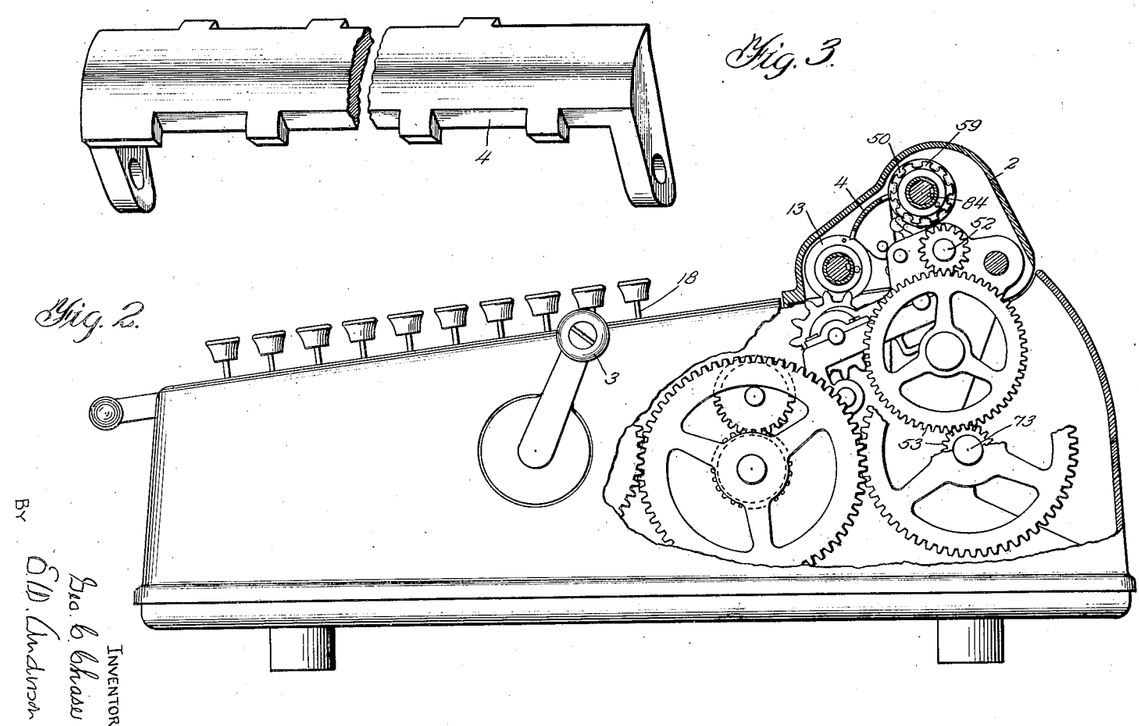
Figure 2 is a side view of the machine, with the numeral wheel carriage in section and parts of the casing broken away.
Figure 4:
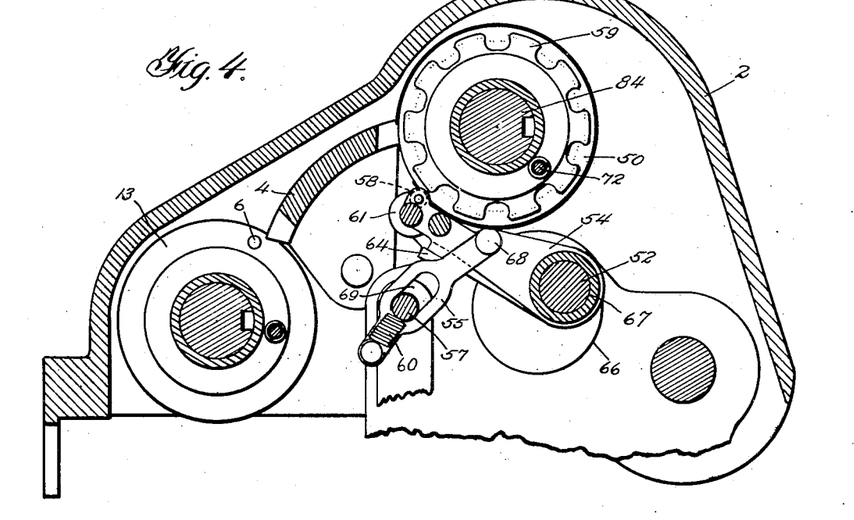
Figure 4 is a section taken on the line Y—Y, Figure 1, looking in the direction of the arrow.
Figure 5:
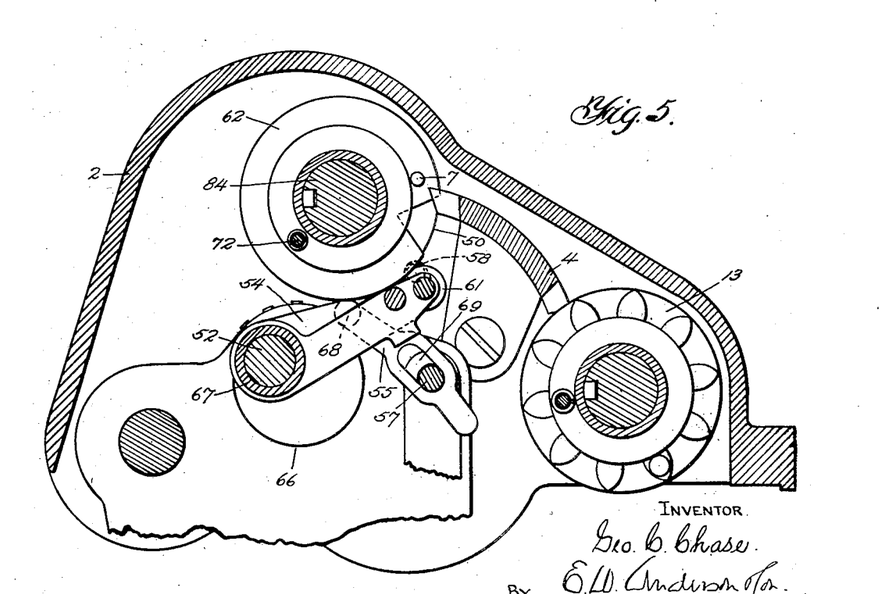
Figure 5 is a section taken on the same line, looking in the opposite direction.
Figure 6:
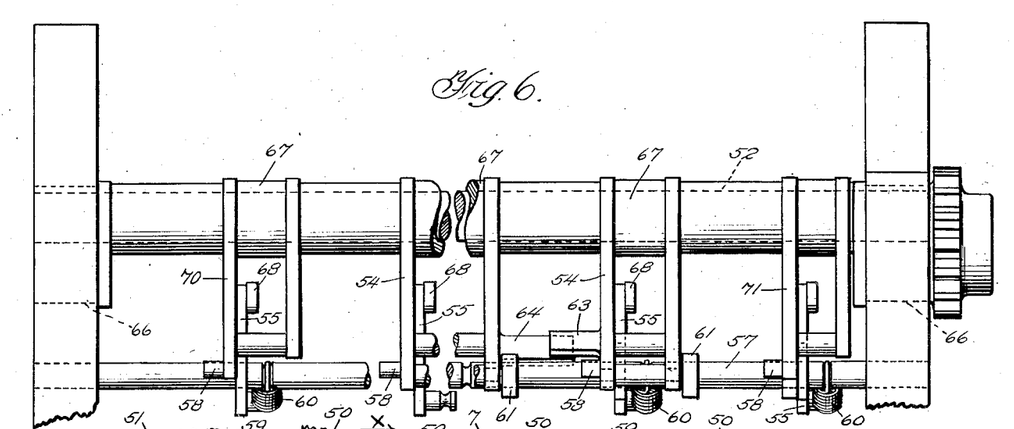
Figure 6 is a plan view of the carry and counting pawl assembly partly broken away.
Figure 7:
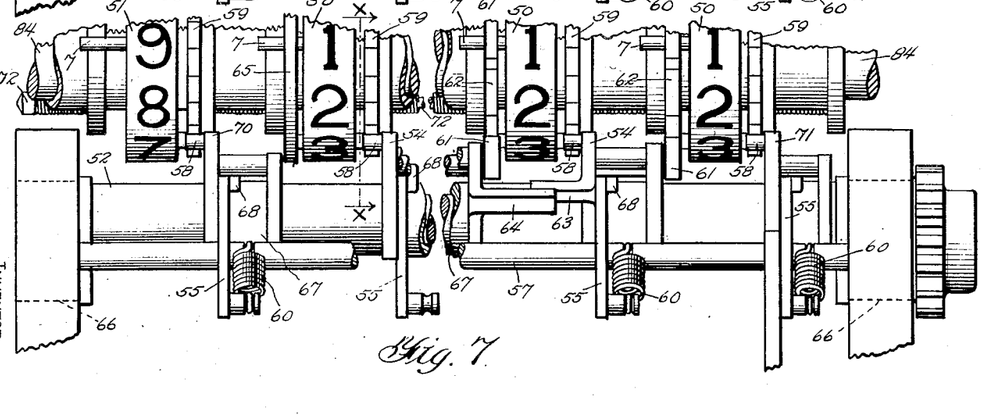
Figure 7 is a front view of the same, as related to the counting wheels.
Figure 8:
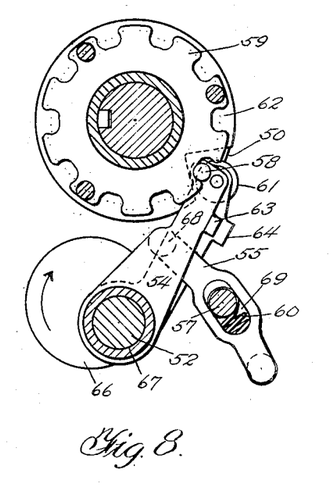
Figure 8 is a detail section, taken on the line X—X, Figure 7, showing the parts in position taken during a subtractive carry.
Figure 9:
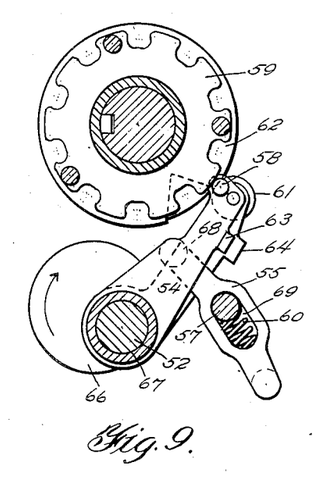
Figure 9 is a similar view, the parts being in position taken during subtractive rotation, with no carry occuring.
Figure 10:
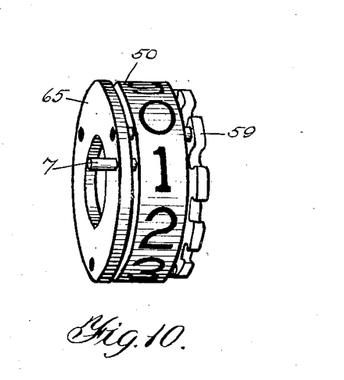
Figure 10 is a detail perspective view of the extreme left-hand multiplier wheel, with unnotched disk.
Figure 11:
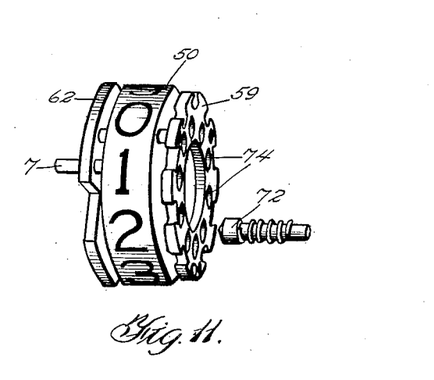
Figure 11 is a similar view of any other multiplier wheel, together with its spring numeral-alignment device.

It may be noted that Figure 1 shows the keyboard setting and the various numeral wheel readings at the completion of a problem wherein 14,693,525 has been divided by 34,573 the dividend having first been placed on the wheels 13. There being no remainder, the numeral wheels 13 now stand at 0, the counting wheels 51 registering the quotient, 425, and the counting wheels 50 registering the complement of the quotient, 99,999,576.

To accomplish these various results, the following means are provided:—

The shaft 52 is eccentrically mounted at 66 in the main framing, and is driven by the shaft 73 of the main operating train by gearing 53. Pawls 54 and 71 are pivoted at 67 upon said shaft and are spaced from each other in accord with the spacing of and related respectively to the counting wheels 50, said relation varying with the shifting of the carriage wherein said wheels are mounted, said pawls having springs 60 serving to hold the same toward said wheels, with the gears 59 of which the pawls have driving engagement. It is obvious that the eccentric rotation of the shaft 52 will give said pawls a reciprocatory movement adapted to rotate said wheels in one direction, even with the use of ordinary spring pawls.

Means are provided, however, whereby the counting wheels shall be rotated selectively in either direction, the gears 59 being for this purpose made with notches, with which the pawls are adapted to engage, through lateral pins 58 thereof, and links 55 being provided, having at their one end slots 69 engaged by a rod 57, parallel to shaft 52, and at their other ends having pivoted connection 68 with said pawls.

In the normal full-cycle position of the shaft 52, wherein the pivoted ends 67 of the pawls approach the wheels 50, the bearing of the links 55 upon the rod 57 will hold the pins 58 away from the gears 59, against the tension of the springs 60. Upon rotation of shaft 52, in either direction, the restraining connection 55, 57, serves to give said pawls a pivotal movement upon studs 68 in a direction radial of the wheels 50 and transverse of their reciprocatory forward and back movement, to engage the pawl pins with the gear notches previous to actuation of the gears and to lift said pins from said notches after the actuation of said gears, said means also serving to hold the pawl pins from frictional engagement with the gears, against the tension of said springs, during the idle strokes of the pawls. The slots of the links admit of free movement of the parts during that portion of the rotation of shaft 52 wherein the pivoted ends 67 of the pawls approach the rod 57.

The direction of the effective strokes of the pawls will be reversed upon reverse rotation of the shaft 52 brought about by reverse rotation of crank handle 3, the paths of reciprocatory movement of the pawls being the same in both cases and the action or functioning of the pawls being also the same.

A further function of the means which provide for reversibility consists in checking the tendency to overrotation of the numeral wheels. This is effected by the engagement of pins 58 with the walls of the notches of gears 59, during which engagement the wheels 50 are limited in their movement by the pawls. The pawls therefore impart a harmonic movement to the wheels, the speed being gradually accelerated and thereafter diminished to zero, in addition to which the wheels are also restrained during the radial disengaging movement of the pins 58. Thus, these pawls serve not only as actuating members, but also as detents, and, together with the usual spring numeral alignment devices 72, will be sufficient to provide for correct registration of the wheels 50, these devices, by engagement in the spaced recesses 74 serving to maintain the wheels in their position of rest between cycles of operation.

The preceding paragraphs describe the complete operation of the extreme right-hand pawl 71, which constitutes a counting finger, adapted to move the counting wheel 50 which may be at the time aligned therewith one numeral step in a forward or reverse direction at each rotation of crank handle 3. A similar pawl 70, upon shaft 52, operates as a counting finger for the other series of wheels 51, but is functionally independent of the pawls 54 aforesaid, of the series of which it forms no part.

The higher order or left-hand pawls 54 are carry members, and their action upon the gears 59 is controlled by anti-friction rollers 61, mounted upon the pawls and adapted normally to ride each upon the periphery of a notched disk 62, fast to the next lower order counting wheel, during the effective portion of the carry cycle and thus prevent the action of the related pin 58 upon the gear 59. As the lower order counting wheel 50 moves to 9 registering position in forward rotation or to 0 registering position in reverse rotation, the notch of this disk 62 will be in position to receive the roller 61 of the higher order pawl, upon the inward radial or engaging movement of the pin 58 occurring in the next rotation of the shaft 52 in the same direction, allowing the pin 58 to act upon the gear 59 and move the higher order counting wheel one step.

The means above described for giving the pawls 54 a pivotal movement in a radial direction to engage the pawl pins with the gear notches and to lift said pins from said notches and hold them from frictional engagement with the gears during the idle strokes of the pawls, is effective also to engage the rollers 61 with the notches of disks 62, to lift said rollers from the notches and to hold them disengaged from the disks, precisely as stated for the pawl pins and gear notches.

In order that a higher order counting wheel, standing at 9 in forward rotation or at 0 in reverse rotation, but receiving no impulses, may not cause a carry to the next higher order wheel, all of the pawls 54 except that at the right-hand end have supporting contact with each other by means of lugs 63, 64, the lugs 63 of the lower order pawls having underlapping free end contact with the lugs 64 of the higher order, to hold the pins 58 of the higher order pawls away from the gears 59 so long as a lower order roller 61 rides upon the periphery of its disk 62. Thus no carry can occur unless the counting wheel 50 associated with the extreme right-hand pawl 71 passes from 9 to 0, or from 0 to 9, in which case the carry will be simultaneously effected as far to the left as required.

When the carriage is in extreme left-hand position, a counting wheel 50 will be aligned with each pawl 54, and with pawl 71, and the extreme right-hand wheel 51 will be aligned with the counting finger 70. The carriage being moved to the right, one or more of the pawls 54 will now be aligned with the counting wheels 51, which latter would be in position, according to the mechanism so far described, to received a carry from the wheels 50. The numbers being arranged oppositely about the peripheries of the counting wheel series 50 and 51, it is obvious that the two series are distinct, and that the wheels 51 cannot properly be used to continue a registration effected upon wheels 50.

Means are therefore provided to prevent a carry from the extreme left-hand wheel 50 to the extreme right-hand wheel 51 (having the result of preventing a carry to any of the wheels 51, owing to the lapping engagement of the lugs 63, 64). This means consists of a complete or unnotched disk 65 upon the extreme left-hand wheel 50, said disk preventing the pawl 54 to the left thereof and having a roller 61 aligned therewith, from entering the notch gear of the right-hand counting wheel 51 at any time. The counting finger 70, related to the wheels 51, has no roller and will not be prevented from function by said disk 65.

Since the counting wheels 50 are free of contact with the driving mechanism in the normal or full-cycle position of the parts, they may be set to zero by the functioning of any suitable device, without interference with such mechanism, whether by the carrying or counting members thereof. As shown, a bar 4, cooperating with pins 6 and 7, serves to check the numeral wheels 13 and the counting wheels 50 and 51 in zero-registering position during the clearing operation, in the manner described in the said patent to Baldwin, No. 1,275,119, said bar being the equivalent of the rock bar and radial projections of said patent.

In the machine to which the invention has been shown as applied, the registering mechanism has a full-cycle position extending through a considerable zone of movement upon each side of the true normal or balanced position of the parts, and obviously, the crank handle 3 may be left at rest anywhere within this zone. It is therefore an advantage of the present construction that the pawls 54, 70 and 71 remain disengaged from wheels 50 and 51 during movement of the counter actuating mechanism through a considerable zone upon each side of normal position, this zone, in the construction illustrated corresponding to about 70° of crank movement, in either direction, from normal. That is to say with the crank handle 3 left at rest anywhere within this extended full-cycle zone, the wheels 50, 51 may be restored to zero or the carriage 2 shifted without interference by the pawls.

It will be noted that according to the present invention the carry impulse is imparted from the driving means independently to each counting wheel 50, and not through one wheel to the other, so that there is no building up of tension or of friction across the machine; nor is there any lag to retard the action, from right to left, as in gearing connections.

I claim:—

1. In a calculating machine, reversible numeral wheels, and carry mechanism therefor including actuating means having a universal element, members carried and reciprocated thereby, and members carried by the numeral wheels and individually engaged by the actuator members, said means adapted to rotate said numeral wheels selectively in either direction.

2. In carry mechanism for the numeral wheels of calculating machines, actuating means including a universal element, actuating members carried and reciprocated thereby, members carried by the numeral wheels and individually driven by the actuating members, and means for shifting said actuating members relatively to said wheels to control different wheels.

3. In a calculating machine, a shiftable carriage, numeral wheels mounted thereon, and carry mechanism for said wheels including actuator means having a universal element mounted upon the main frame, members carried and reciprocated by the actuator element, and members upon the numeral wheels engaged selectively by the actuator members according to the shifted position of the carriage.

4. In carry mechanism for the numeral wheels of calculating machines, actuating means including an eccentrically mounted universal shaft, members carried thereby, and members carried by the numeral wheels and engaged individually by the actuator members.

5. In carry mechanism for the numeral wheels of calculating machines, actuating means including an eccentrically mounted universal shaft, spring-tensioned pawls mounted thereon, and teeth upon the numeral wheels and engaged by said pawls.

6. In carry mechanism for the numeral wheels of calculating machines, actuating means including an eccentrically mounted universal shaft, spring-tensioned pawls mounted thereon, teeth upon the numeral wheels and engaged by said pawls, and means adapted to hold said pawls normally out of and to permit them to move into engagement with said teeth.

7. In carry mechanism for the numeral wheels of calculating machines, actuating means including a universal element, spring pressed pawls mounted thereon, and teeth upon the numeral wheels and yieldably engaged by said pawls, said means being adapted to rotate said numeral wheels selectively in either direction.

8. In carry mechanism for the numeral wheels of calculating machines, actuating means including a universal shaft, spring-tensioned pawls carried thereby, teeth carried by the numeral wheels and engaged by said pawls, and means whereby said pawls shall rotate said numeral wheels selectively in either direction.

9. In carry mechanism for the numeral wheels of calculating machines, actuating means including a universal shaft, spring-tensioned pawls carried thereby, teeth carried by the numeral wheels and engaged by said pawls, and means whereby said pawls shall rotate said wheels in either direction upon selective rotation of said shaft.

10. In carry mechanism for the numeral wheels of calculating machines, actuating means including a universal shaft, spring-tensioned pawls carried thereby, teeth carried by the numeral wheels and engaged by said pawls, and means whereby said pawls shall rotate said numeral wheels selectively in either direction, including a rod parallel to said shaft, and slotted links carried by said rod and having a pivotal connection with said pawls.

11. In carry mechanism for the numeral wheels of calculating machines, actuating means including a universal shaft, spring-tensioned pawls carried thereby, teeth carried by the numeral wheels and yieldably engaged by said pawls, means adapted to hold said pawls normally out of and to permit them to move into individual engagement with said teeth, and means whereby said pawls shall rotate said teeth and wheels in either direction.

12. In carry mechanism for the numeral wheels of calculating machines, actuating means including a universal shaft, spring-tensioned pawls carried thereby, teeth carried by the numeral wheels and engaged by said pawls, means adapted to hold said pawls normally out of and to permit them to move into individual engagement with said teeth, including notched disks upon the numeral wheels, and means whereby said pawls shall rotate said wheels in either direction, including a rod parallel to said shaft, and slotted links carried by said rod and having pivotal connection with said pawls.

13. In a calculating machine, reversible numeral wheels, and means adapted to effect a carry to a higher order wheel simultaneously with the passage of a lower order wheel through carry position in either direction of rotation, including actuating means having a universal element, and means for driving each numeral wheel individually from said element and adapted to rotate said wheels in either direction.

14. In a calculating machine, a shiftable carriage, numeral wheels mounted thereon, and means adapted to effect a carry to a higher order wheel simultaneously with the passage of a lower order wheel through carry position, including actuating means having a universal element mounted in the main frame, and means including members carried by said element and adapted each to drive the numeral wheel related thereto in the shifted position of the carriage.

15. In a calculating machine, numeral wheels, and means adapted to effect a carry to a higher order wheel simultaneously with the passage of a lower order wheel through carry position, including actuating means having an eccentrically mounted universal shaft, spring-tensioned pawls carried thereby, and teeth upon the wheels and engaged by said pawls in the rotation of said actuator shaft.

16. In a calculating machine, reversible numeral wheels, carry means therefor including elements upon said wheels and actuator elements, said means being adapted to rotate said wheels selectively in either direction and to move the actuator elements through a full-cycle zone of at least forty-five degrees to and forty-five degrees from normal position invariably in a path out of contact with the numeral wheel members.

17. In a calculating machine, numeral wheels, carry means therefor including elements upon said wheels and actuator elements shiftable relatively to said wheels to control different wheels, said means being adapted to move the actuator elements through a full-cycle zone of at least forty-five degrees to and forty-five degrees from normal position invariably in a path out of contact with the numeral wheel members.

18. In a calculating machine, reversible numeral wheels, carry means therefor including a universal actuator element, members carried thereby, and members carried by the numeral wheels and individually engaged by the actuator members, said means being adapted to rotate said wheels selectively in either direction and to hold the actuator members invariably out of contact with said wheels during the movement of said universal element through a full-cycle zone of at least forty-five degrees to and forty-five degrees from normal position.

19. In a calculating machine, numeral wheels, carry means therefor including a universal actuator element, members carried thereby and members carried by the numeral wheels and shiftable relatively to the actuator members for selective engagement thereby, said means being adapted to hold the actuator members invariably out of contact with said wheels during the movement of said universal element through a full-cycle zone of at least forty-five degrees to and forty-five degrees from normal position.

20. In carry mechanism for the numeral wheels of calculating machines, actuating means including a universal element, spring tensioned pawls mounted thereon, and teeth upon the numeral wheels yieldably engaged by said pawls, said means being adapted to rotate said numeral wheels selectively in either direction and to hold the pawls out of contact with said teeth during the movement of the universal elements through a full-cycle zone to and from normal position.

21. In carry mechanism for the numeral wheels of calculating machines, actuating means including a universal shaft, spring-tensioned pawls carried thereby, teeth carried by the numeral wheels and engaged by said pawls, and means whereby said pawls shall rotate said numeral wheels selectively in either direction and whereby said pawls shall be held out of contact with said teeth during the rotation of said shaft through a full-cycle zone to and from normal position.

22. In a calculating machine, reversible numeral wheels, and means adapted to effect a carry to a higher order wheel simultaneously with the passage of a lower order wheel through carry position in either direction of rotation, including members upon the numeral wheels and actuator members, said means being adapted to give said actuator members a normal full-cycle position out of contact with the numeral wheel members and to rotate said numeral wheels selectively in either direction.

23. In a calculating machine, a shiftable carriage, numeral wheels mounted thereon, and means adapted to effect a carry to a higher order wheel simultaneously with the passage of a lower order wheel through carry position, including members upon the numeral wheels, and actuator members mounted in the main frame, said means being adapted to give the actuator members a normal full-cycle position out of contact with the numeral wheel members, and the actuator members being adapted each to drive the numeral wheel related thereto in the shifted position of the carriage.

24. In carry mechanism for the numeral wheels of calculating machines, actuating means including spring-tensioned members and driven members, and means including members upon the wheels adapted to hold the spring-tensioned members normally out of and to permit them to move into engagement with the driven members during the operative cycle of the machine, said actuating means being adapted to give the spring-tensioned members a normal full-cycle position out of contact with the numeral wheel members.

25. In carry mechanism for the numeral wheels of calculating machines, actuating means including spring-tensioned pawls, teeth upon said wheels, means for reciprocating said pawls, means for holding said pawls normally out of and permitting them to move into engagement with said teeth during the operative cycle, including notched disks upon the wheels, and means whereby said pawls are given a normal full-cycle position out of contact with said notched disks, including a rod, and slotted links carried by said rod and pivotally connected with said pawls.

26. In a calculating machine, reversible numeral wheels, operating means therefor, and carry mechanism including actuator members, driven members, means for reciprocating the actuator members during each operative cycle, and means upon the numeral wheels adapted to hold the actuator members normally out of and to permit them to move into engagement with the driven members, said mechanism being adapted to rotate the numeral wheels selectively in either direction.

27. In a calculating machine, a shiftable carriage, numeral wheels thereon, operating means for said wheels, and carry mechanism for said wheels including actuator members upon the main frame, driven members, means for moving each actuator member during each operative cycle, and means upon each numeral wheel adapted to hold the actuator member related thereto in the shifted position of the carriage normally out of and to permit it to move into engagement with the next higher order driven member.

28. In a calculating machine, numeral wheels, operating means therefor, and carry mechanism including actuator members and driven members, means for moving each actuator member during each operative cycle, members upon the numeral wheels for holding the actuator members normally out of and permitting them to move into engagement with the driven members during the operative cycle, and means whereby said actuator members are given a normal full-cycle position out of contact with the numeral wheel members.

29. In carry mechanism for the numeral wheels of calculating machines, actuating means including teeth carried by the numeral wheels, spring-tensioned pawls, and means for moving said pawls selectively into engagement with said teeth and for operating the engaged pawls to advance said wheels and to check the momentum thereof.

30. In a calculating machine, reversible numeral wheels, and carry mechanism therefor including teeth carried by the numeral wheels, spring-tensioned pawls, and means for moving said pawls into engagement with said teeth and for operating said pawls to advance said wheels in either direction and to check the momentum thereof.

31. In carry mechanism for the numeral wheels of calculating machines, actuating means including teeth carried by the numeral wheels, spring-tensioned pawls, means for moving said pawls into engagement with said teeth and for operating said pawls to advance said wheels and to check the momentum thereof, and means adapted to hold said pawls normally out of and to permit them to move selectively into engagement with said teeth.

32. In carry mechanism for the numeral wheels of calculating machines, actuating means including teeth carried by the numeral wheels, spring-tensioned pawls, and means for moving said pawls radially of said wheels selectively into engagement between said teeth, for advancing the engaged pawls and said wheels, and for moving said pawls radially of said wheels out of engagement with said teeth.

33. In carry mechanism for the numeral wheels of calculating machines, actuating means including teeth carried by the numeral wheels, an eccentrically mounted universal shaft, spring-tensioned pawls mounted thereon, and means for moving said pawls radially of said wheels into engagement between said teeth, for advancing said pawls and said wheels, and for moving said pawls radially of said wheels out of engagement with said teeth, including a rod parallel to said shaft and slotted links carried by said rod and having pivotal connection with said pawls.

34. In a calculating machine, numeral wheels, normal aligned position locating mechanism therefor, and actuating mechanism adapted for registering and carry operations, said actuating mechanism imparting a harmonic accelerated and retarded movement to the numeral wheels.

35. In a calculating machine, numeral wheels, normal aligned position locating mechanism therefor, and actuating mechanism adapted for registering and carry operations, said actuating mechanism including pawls adapted to receive and to impart a harmonic accelerated and retarded movement to the numeral wheels.

36. In a calculating machine, numeral wheels, normal aligned position locating mechanism therefor, and actuating mechanism adapted for registering and carry operations, said actuating mechanism including an eccentrically mounted universal shaft, and spring-tensioned pawls mounted thereon and adapted to impart a harmonic accelerated and retarded movement to the numeral wheels.

37. In a calculating machine, numeral wheels, normal aligned position locating mechanism therefor, and actuating mechanism adapted for registering and carry operations, said actuating mechanism including teeth upon said numeral wheels, a shaft, spring-tensioned pawls mounted thereon and adapted to engage said teeth and impart a harmonic accelerated and retarded movement to the numeral wheels, and means adapted to hold said pawls normally out of and to permit them to move into engagement with said teeth.

38. In a register, numeral wheels, and actuating means therefor including teeth, carried by the numeral wheels, and positively operated actuators, said means adapted to impart a harmonically retarded movement to the numeral wheels and to hold said actuators in positive restraining engagement with said teeth until the wheels are brought to rest.

39. In a register, reversible numeral wheels, and actuating means therefor including teeth carried by the numeral wheels, and positively operated actuators, said means adapted to impart a harmonically retarded forward or reverse movement to the numeral wheels and to hold said actuators in positive restraining engagement with said teeth until the wheels are brought to rest.

40. In a register, reversible numeral wheels, and carry mechanism therefor including actuating means adapted to impart to each numeral wheel to which a carry is to be effected a one step movement in either direction during approximately a half-cycle of movement of said means.

41. In a register, reversible numeral wheels, and carry mechanism therefor including a universal actuator, and pawls operated thereby to impart to each numeral wheel to which a carry is to be effected a one step movement in either direction during approximately a half-cycle of movement of said actuator.

42. In a register, reversible numeral wheels, and carry mechanism therefor including teeth on the numeral wheels, a universal actuator, and pawls operated thereby to impart to each numeral wheel to which a carry is to be effected a one step movement in either direction during approximately a half-cycle of movement of said actuator and adapted to move in a path out of contact with said teeth during approximately the other half cycle of movement.

43. In a register, numeral wheels, and carry mechanism therefor including a universal actuator, and pawls operated thereby through a three-part cycle, the pawls being brought to operative position during substantially the first quarter of said cycle, acting to rotate the numeral wheels during substantially the next half-cycle and being restored to normal position during substantially the last quarter cycle.

44. In a register, reversible numeral wheels, and carry mechanism therefor including a universal actuator, and pawls operated thereby through a three part cycle, the pawls being brought to operative position during substantially the first quarter of said cycle, acting to rotate the numeral wheels forwardly or reversely during substantially the next half cycle and being restored to normal position during substantially the last quarter cycle.

45. In a register, numeral wheels, and actuating means therefor including positively operated actuators, said means adapted to impart to any numeral wheel a harmonically accelerated and retarded one step movement during approximately a half-cycle of movement of said means and to hold said actuators in positive restraining engagement with said wheels until the latter are brought to rest.

46. In a register, reversible numeral wheels, and actuating means therefor including positively operated actuators, said means adapted to impart to any numeral wheel a harmonically accelerated and retarded one step movement in either direction during approximately a half-cycle of movement of said means and to hold said actuators in positive restraining engagement with said wheels until the latter are brought to rest.

47. In carry mechanism for the numeral wheels of calculating machines, actuating means including a rotary universal shaft having actuator members mounted thereon and adapted during each rotation thereof to impart to each actuator member a total movement corresponding to one step of movement of a numeral wheel.

48. In carry mechanism for the numeral wheels of calculating machines, actuating means including members, numeral wheel members engageable thereby, and a universal element adapted during each operative cycle thereof to impart to each actuator member a total movement corresponding to one step of movement of a numeral wheel, said means being adapted to rotate said numeral wheels selectively in either direction.

49. In a calculating machine, operating means, counting wheels, and carry mechanism including actuating means having a rotary universal shaft and actuator members mounted thereon, said shaft being adapted to drive an actuator member throughout the entire operative cycle and to impart thereto a total movement during said cycle corresponding to one step of movement of a counting wheel.

50. In a calculating machine, operating means, counting wheels, and carry mechanism including actuating means having a rotary universal shaft and actuating members mounted thereon, said shaft being adapted to drive said members throughout the entire operative cycle and to give to each member a total movement during said cycle corresponding to one step of movement of a counting wheel, and means for controlling the effective action of said actuator members.

51. In a calculating machine, operating means, counting wheels, members thereon, and carry mechanism including actuating means having a rotary universal shaft, spring-tensioned pawls thereon, said shaft being adapted to drive said pawls throughout the entire operative cycle and to give each pawl a total movement during said cycle corresponding to one step of movement of a counting wheel, and means upon said wheels adapted to hold said pawls normally out of and to permit them to move into engagement with the counting wheel members.

52. In a calculating machine, operating means, counting wheels, and carry mechanism including actuating means having an eccentrically mounted universal shaft and spring-tensioned pawls mounted thereon, said shaft being adapted to drive said pawls throughout the entire operative cycle and to give each pawl a total movement during said cycle corresponding to one step of movement of a counting wheel.

53. In a register, counting wheels, actuating means including a counting pawl, carry elements, and a universal member adapted to reciprocate said pawl and said elements individually, said means being adapted to rotate said counting wheels selectively in either direction.

54. In a register, counting wheels, actuating means including a counting pawl, carry elements, and a universal member adapted to actuate said pawl and said elements individually to act upon the wheels simultaneously, said means being adapted to rotate said counting wheels selectively in either direction.

55. In a register, counting wheels, actuating means including a spring-engaged counting pawl, spring-engaged carry pawls, and a universal member adapted to actuate said counting and said carry pawls individually, said means being adapted to rotate said counting wheels selectively in either direction.

56. In a register, counting wheels, actuating means including a counting pawl, carry elements, and an eccentrically mounted universal shaft adapted to actuate said pawl and said elements individually.

57. In a calculating machine, differentially movable numeral wheels, reversible actuating means adapted to register increments or decrements upon said numeral wheels according to the direction of operation, means operable by said actuating means to register an increment automatically during each cycle of operation in either direction, including a set of counting wheels, and carry mechanism for said counting wheels.

58. In a calculating machine, differentially movable numeral wheels, reversible actuating means adapted to register increments or decrements upon said numeral wheels according to the direction of operation, means operable by said actuating means to register an increment automatically during each cycle of operation in either direction, including two sets of reversely numbered counting wheels, and carry mechanism for the wheels of one set.

59. In a calculating machine, two sets of counting wheels, means operable to register a unitary increment upon a wheel of one set and a unitary decrement upon a wheel of the other set during each cycle of operation of the machine, and carry mechanism between the wheels of said last-named set.

60. In a calculating machine, two sets of reversible counting wheels, means operable to register a unitary increment upon a wheel of either set and a unitary decrement upon a wheel of the other set during each cycle of operation of the machine, and carry mechanism for the wheels of one set.

61. In a calculating machine, a shaft, two sets of numeral wheels mounted thereon, actuating means for said wheels including carry members for the wheels of the first set, said wheels and said means being shiftable relatively to each other, and means for holding each of said carry members in idle position when a wheel of the second set is in shifted position opposite thereto.

62. In a calculating machine, a shaft, two sets of counting wheels mounted thereon, actuating means for said wheels including carry members for the wheels of the first set, said wheels and said means being shiftable relatively to each other, means for holding a higher order member out of action until the next lower order member is allowed to act, and means upon the highest order wheel of the first set for preventing an actuator member from acting to carry to a wheel of the second set.

63. In a calculating machine, a shaft, two sets of counting wheels mounted thereon, actuating means for said wheels including carry members for the wheels of the first set, said wheels and said means being shiftable relatively to each other, means for holding a higher order member out of action until the next lower order member is allowed to act, notched disks upon the lower order wheels adapted to engage the actuator members and hold the same normally out of action, and a complete disk upon the highest order wheel of the first set adapted to engage an actuator member and withhold the same from acting to carry to a wheel of the second set.

64. In a calculating machine, numeral wheels, actuating and carry mechanism for said wheels adapted to register increments or decrements, including independent carry pawls, means for holding said pawls normally out of action, and means operable when any carry pawl is held out of action to hold any of the higher order carry pawls out of action.

In testimony whereof I affix my signature.

GEORGE C. CHASE.